Nov. 20, 1956 S. KELLY ET AL 2,771,515

ELECTROMECHANICAL TRANSDUCERS

Filed March 10, 1952

Inventors:
Stanley Kelly,
John Watson Brownlee,
By Pierce, Scheffler & Parker,
Attorneys.

United States Patent Office 2,771,515 Patented Nov. 20, 1956

2,771,515

ELECTROMECHANICAL TRANSDUCERS

Stanley Kelly and John Watson Brownlee, Enfield, England, assignors to Cosmocord Limited, Enfield, England, a British company Application March 10, 1952, Serial No. 275,775

8 Claims. (Cl. 179—100.41)

Figure 1:
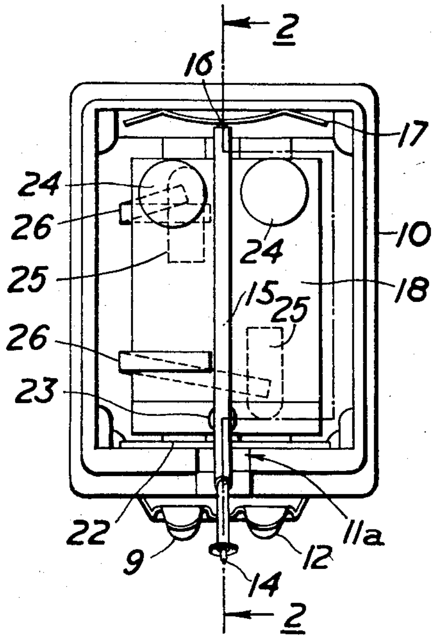

This invention relates to electromechanical transducers of the type comprising a transducing element such as a piezo-electric crystal and a stylus adapted to engage the groove of a gramophone record, with a mechanical coupling between the stylus and the element.

In a known form of transducer of this type the stylus is carried at the one end of a cantilever arm the other end of which is connected to a piezo-electric crystal. Lateral movements of the stylus are transmitted to the crystal by the arm, and the compliance of the arm is greater in the vertical direction than in the horizontal direction, with the usual lateral recording.

Theoretically, the groove of a conventional gramophone record is cut to a constant depth, and the contour of the groove is such that a correctly dimensioned stylus will never touch the bottom of the groove, so that in theory no vertical motion is imparted to the stylus with the usual lateral recording. In practice, however, this ideal condition in which no "bottoming" of the stylus occurs is approached with standard 78 R. P. M. recordings when used with a hard stylus of .0025 to .003 inch tip radius provided that vertical pressure is not excessive; in the case of the slower speeds used with so-called "long-playing" records, bottoming occurs more often. The presence of dust in the bottom of the groove is also a consideration, and in general it does occur that the stylus has imparted to it an appreciable degree of vertical movement. The output of the transducer is accordingly distorted to the extent that the piezo-electric crystal will respond to such movements; investigations show that the crystal may be shock-excited at its fundamental resonance frequency, or at subharmonic frequencies thereof, and experiments also show that the distortion can be reduced if such vertical motion is prevented from reaching the piezo-electric element.

Theoretically the transmission of such vertical movements to the piezo-electric element can be reduced by increasing the vertical compliance of the arm, but since this arm must be capable of applying pressure to the stylus sufficient for correct tracking, it follows that the compliance must not be increased above a certain value.

In accordance with the present invention there is provided a transducer of the type referred to, in which the cantilever arm is mounted by means whereby it may move laterally, to follow the lateral movements of the stylus in the record groove, said mounting means being arranged to offer substantially greater resistance to movement corresponding to vertical movement of the cantilever arm, the piezo-electric element being attached to said mounting means at one part or zone of the element, the other parts of the element being free or engaged by means which do not rigidly limit movement of the element at those parts in the direction corresponding to vertical movement of the cantilever arm. It will be understood that the terms "vertical" and "horizontal" as used in this specification are used in the relative sense only.

Figure 2:
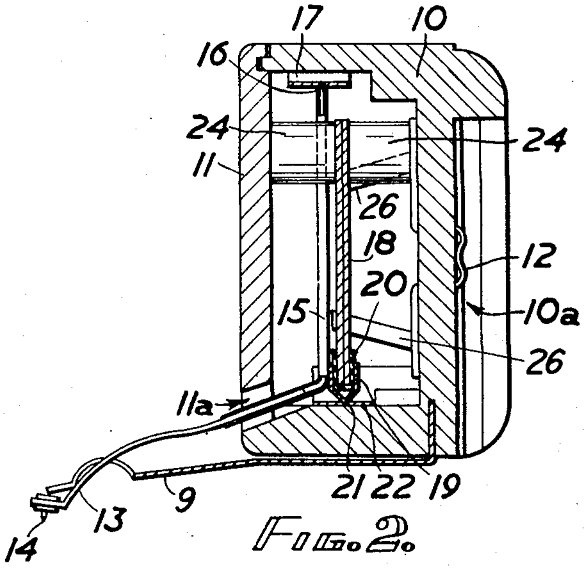

Further features of the invention will be apparent from the following description of an embodiment thereof, as applied to a gramophone pickup in conjunction with the accompanying drawing, in which:

Figure 1 is a front elevational view, with the front wall of the casing removed, of the pickup, and Figure 2 is a transverse sectional view, on the line 2—2 of Figure 1, but with the front wall of the casing in position.

The pickup comprises a box-like body 10 of moulded insulating material the front of which is closed by a separate cover 11. The body has grooves **10*a* on the back by which it can be held on the end of a support arm in known manner; electrical contacts 12** are also provided on the back.

The cantilever arm 13, which carries a small sapphire stylus 14 at its end, extends forwardly and downwardly from the body, through an opening **11*a* in the lower edge of the cover. A forked protecting arm 9 also extends forwardly from the body, the arm being moulded at its end as an insert in the body. The arm 9 normally lies clear of the record surface when the pickup is in use, but engages the record should the pickup be dropped, thus relieving the strain on the cantilever arm 13**.

The arm 13 is made from metal strip of rectangular or other cross section so that the arm has substantially greater vertical than horizontal compliance. The cantilever arm 13 is supported at its rearward end by a mounting which includes a small metallic tubular rod 15, disposed vertically and roughly centrally in the interior of the body and pivotally mounted near the top and bottom thereof so as to be capable of movement about an approximately vertical axis. The lower end of the tube is bent forwardly and downwardly and receives the end of the cantilever arm 13 which is inserted into its open end and there held by adhesive or solder.

The upper pivot bearing for the tube is formed by a pin or point 16 at the end of the tube engaging a small V-shaped depression in a metal strip 17 resting against the inner top wall of the body 10. The strip may be made of spring metal and curved slightly as shown so as to impart a light downward pressure on the tube pivot.

The pivot for the lower end of the tube is combined with means for receiving the lower end of the piezo-electric element 18. The element is a bimorph crystal element of the "twister" type, of rectangular shape and is arranged in a vertical plane. The bottom edge of the element is held in a channel-shaped metal strip 19, with a thin rubber strip 20 interposed, and a small downward projection 21 forming a pivot is pressed out of the bottom of the channel; this pivot rests in a pivot cup formed in a plate 22 located in the bottom of the body. The lower end of the vertical part of the mounting tube 15 is firmly fixed, as by solder 23, to the channel member so that there is a rigid structure extending between the two pivots. To this rigid structure the piezo-electric element is supported along its lower edge and will be moved efficiently, that is to say through a mechanical system having a low compliance, by the stylus. The thin rubber 20 between the channel 19 and the element 18 has a low compliance, the movement of the element with respect to the channel being negligible.

In order to produce the piezo-electric output, the upper edge or the upper part of the element must be clamped or restrained against movement in the horizontal plane so that the element is subjected by the stylus to the twisting stress necessary for it to produce an output. For this purpose the body may be filled with a viscous gel of appropriate characteristcs, and alternatively or additionally clamping pads 24 of soft rubber or like resilient material can be arranged between the vertical faces of the element and the opposed vertical walls of the interior of the body. Such pads are best located towards the uper part of the element, as shown. The electrodes 25 on the element are connected by flexible leads 26 to the electrical contacts 12 on the body.

A pickup such as that described has substantially reduced sensitivity to vertical motion of the stylus, and thereby the fidelity of output of the pickup is improved, and in addition the mounting of the piezo-electric element reduces the possibility of damage occurring to the element due to shock.

We claim:

1. A gramophone pickup comprising a casing, a relatively rigid rod, pivot means mounting said rod at its end portions in said casing to render said rod capable of movement about its longitudinal axis, a cantilever arm extending laterally of said rod and secured at one end thereof to an end portion of said rod, a stylus secured to the other free end of said arm, said arm having a relatively low compliance for movement of the stylus in a radial direction about the longitudinal axis of said rod to follow the excursions of a record groove and said arm having a relatively high compliance in the direction of said longitudinal axis, and a piezo-electric crystal element secured to said rod only at the same end thereof as is said cantilever arm.

2. A gramophone pickup as defined in claim 1 wherein said crystal element is mechanically connected to said rod along the region of one edge only of the crystal element.

3. A gramophone pickup as defined in claim 2 and further comprising means independent of said rod for restraining said crystal element at a region spaced from the edge connected with said rod.

4. A gramophone pickup as defined in claim 3 wherein said crystal restraining means is comprised of a viscous material between said crystal and casing.

5. A gramophone pickup as defined in claim 3 wherein said crystal restraining means is comprised of clamping pads extending between said crystal element and the walls of said casing.

6. A gramophone pickup as defined in claim 1 wherein said rod and cantilever arm are integral.

7. A gramophone pickup comprising a casing, a rigid rod in said casing, pivot means in said casing mounting one end of said rod, a channel-shaped strip secured intermediate its ends to the opposite end of said rod, pivot means in said casing mounting said strip intermediate its ends thereby to render said rod capable of movement about its longitudinal axis, a piezo-electric crystal element having one edge thereof received in the channel portion of said strip, means restraining the opposite edge of said crystal element against movement and a cantilever arm secured to said rigid rod and projecting laterally thereof, said cantilever arm having a relatively low compliance for movement in a radial direction about the longitudinal axis of said rod and a relatively high compliance for movement in a direction parallel to said longitudinal axis.

8. A gramophone pickup as defined in claim 7 wherein said rigid rod is constituted by an extension of said cantilever arm.

References Cited in the file of this patent

UNITED STATES PATENTS

| | | |
|---|---|---|
| 2,363,497 | S. J. Begun | Nov. 28, 1944 |
| 2,594,948 | Lynch | Apr. 29, 1952 |